UNITED STATES PATENT OFFICE.

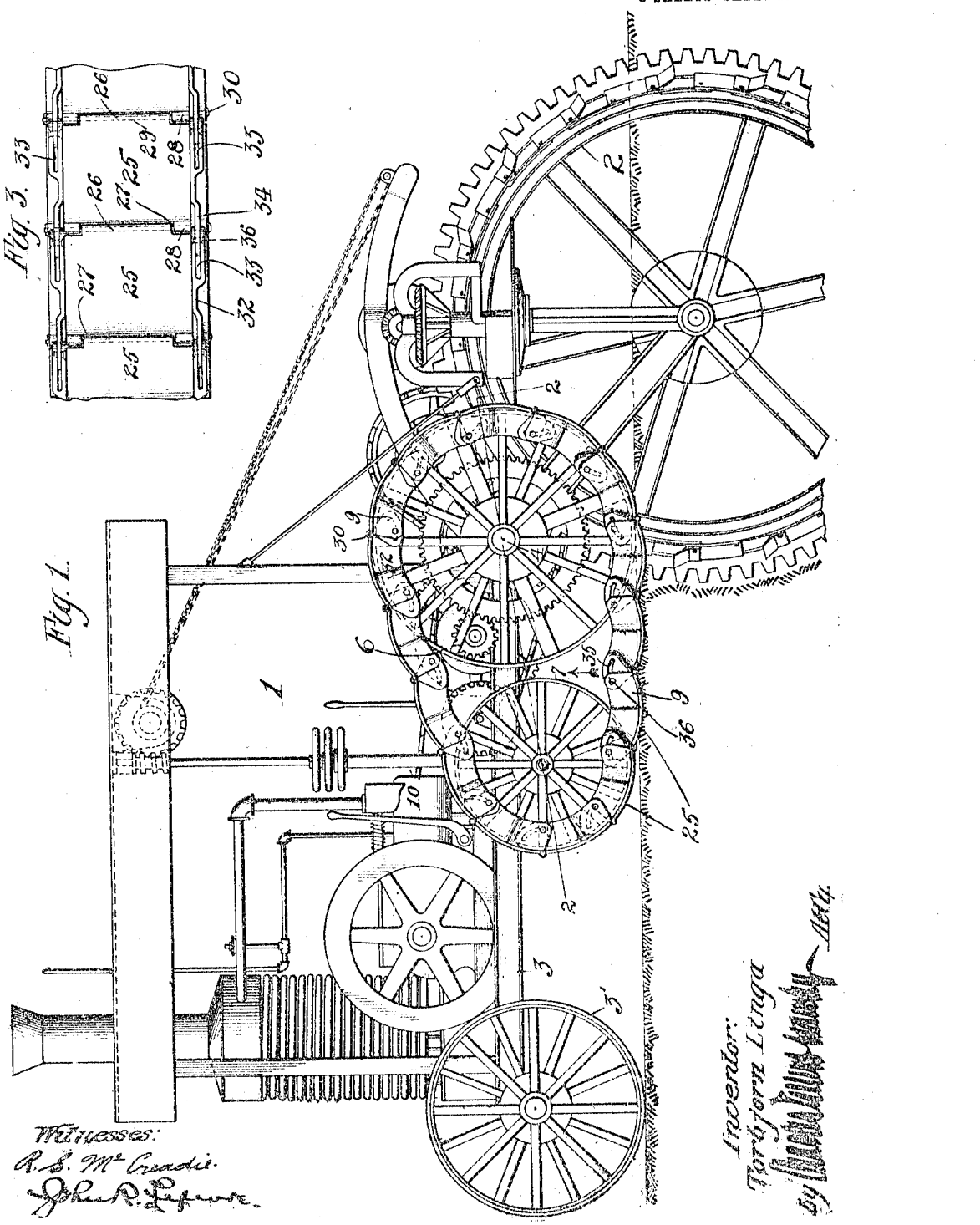

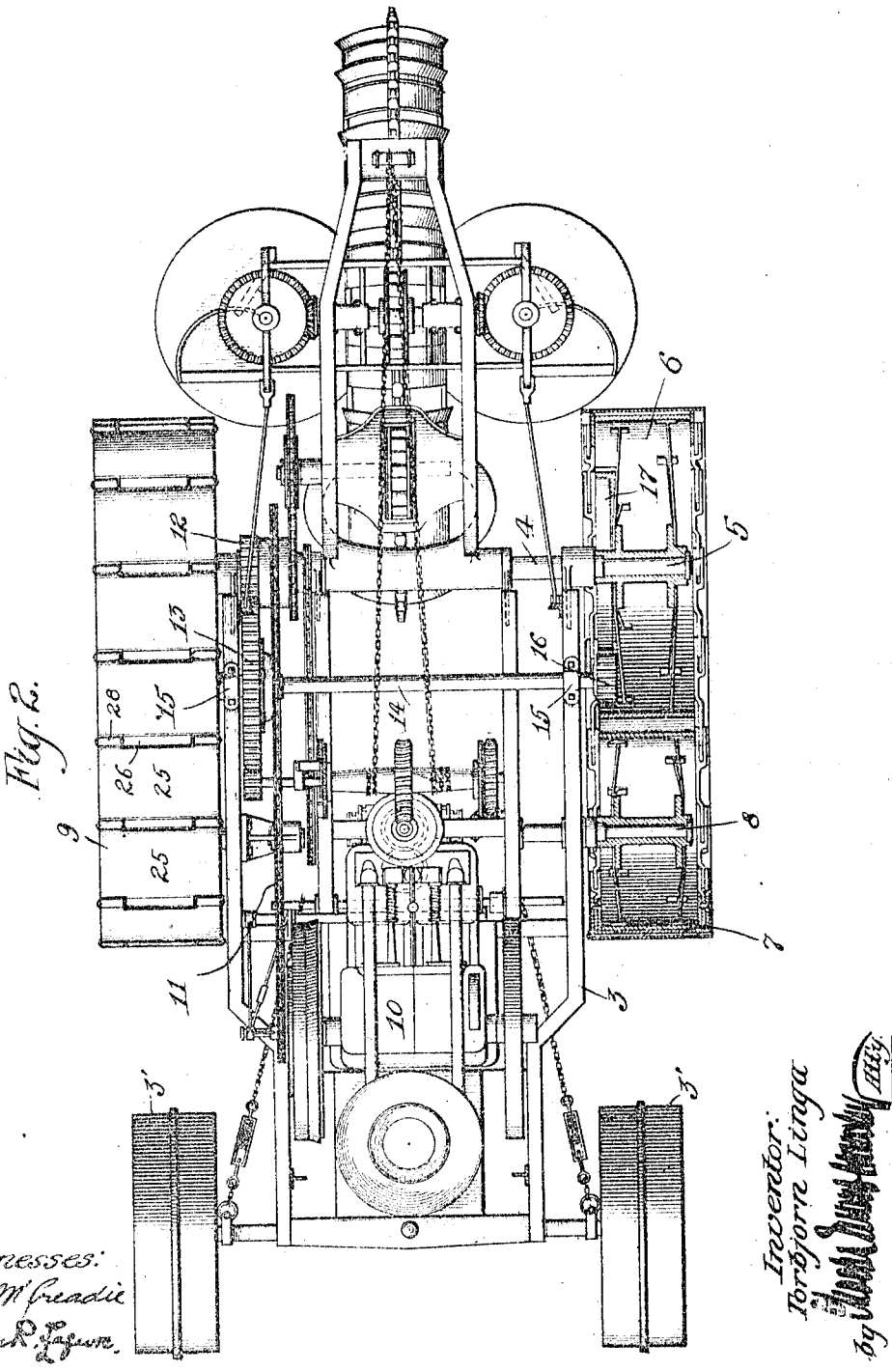

TORBJORN LINGA, OF THOR, IOWA, ASSIGNOR TO AMERICAN DITCHING MACHINE COMPANY, OF WEST MINNEAPOLIS, MINNESOTA, A CORPORATION OF MINNESOTA.

CATERPILLAR FOR DITCHING-MACHINES.

1,116,302.      Specification of Letters Patent.      Patented Nov. 3, 1914.

Application filed September 30, 1910. Serial No. 584,692.

*To all whom it may concern:*

Be it known that I, TORBJORN LINGA, a subject of the King of Norway, residing at Thor, in the county of Humboldt and State of Iowa, have invented certain new and useful Improvements in Caterpillars for Ditching-Machines, of which the following is a full, true, clear, and exact description.

My invention relates to ditching machines of the type used for digging trenches or ditches for drainage or sewerage purposes. Trenches of this character and particularly trenches for drainage purposes usually lie across marshy or swampy country, and the machines, which dig these trenches and which use the ordinary traction wheels, usually sink into the ground to such an extent as to render them difficult to operate.

The object of my invention is to provide a ditching machine with propelling members or caterpillars of such form that the weight of the machine shall be distributed over relatively large areas so that it may safely and repeatedly pass over marshy ground.

A further and particular object of the invention is to provide propelling or caterpillar wheels for ditching machines, which shall comprise few parts, which shall be of simple construction, economical to build and very durable and which shall be comparatively light, adding little to the total weight of the machine.

An incidental object of my invention is to provide propellers or caterpillar wheels which shall be so constructed and arranged with relation to the body of the ditching machine that the latter shall be adapted to travel over hard surfaced and tortuous roads with the same facility as an ordinary traction engine.

My invention comprises a ditching machine in combination with traction devices or caterpillars which present a large tread area or surface over which the weight of the machine is distributed when it is traveling in swampy or marshy country, but which preferably operate in the manner of ordinary traction wheels when the machine is traveling from place to place over hard ground or roadways. In its preferred form my invention comprises two rotatable members, the axes of rotation of which are spaced at some distance apart, and a tread belt or chain encircling both of these members, said belt being so constructed that at all times during the movement of the machine along the ground, the portion of the chain which serves as the tread surface does not bend out of a straight line between the lower portions of the peripheries of the rotatable members. The forward rotatable member is raised slightly above the rearward member, so that the tread surface of the chain lies in a plane at an angle to the surface of the ground. When the machine is traveling over hard ground it is supported on substantially that portion only of the belt which is directly under the rearward rotatable member and the truck is as easily steerable as if ordinary traction wheels were used, but when said machine is passing over marshy country the machine is supported upon an area which has for its length, substantially the distance between the axes of the rotatable members and which has as its width the width of the tread belt.

I will describe one embodiment of my invention, by reference to the accompanying drawings in which:

Figure 1 is a side elevation of a ditching machine showing traction devices or caterpillars as rear supports for the machine truck; Fig. 2 is a plan view of said machine showing one of the caterpillars in section on line 2—2 of Fig. 1; Fig. 3 is an enlarged view of a portion of the tread belt or chain and showing the details of construction thereof.

Like parts will be characterized by similar reference numerals throughout the several views.

In the drawings I have shown a ditching machine having a caterpillar or traction device at its rear end on each side of the truck, these caterpillars taking place of the ordinary rear traction wheels. The numeral 1 refers generally to the truck of the ditching machine and 2 refers to the digging wheel carried by said truck and shown in the act of digging a ditch. The truck comprises a main horizontal frame 3, preferably made substantially in the form of a rectangle and provided at its rear end with an axle 4. The ends of this axle project beyond the sides of said frame and serve as bearing portions 5 upon which one wheel or member 6 of each of the caterpillars is rotatably mounted. The other member 7 of each of the caterpillars is rotatably mounted on the projecting ends of stud shaft 8 supported in the framework 3 intermediate the front and rear ends of said framework. The rear axle 4 and the stud shafts 8 are substantially parallel and are spaced some distance apart. Encircling or surrounding the rotatable members 6 and 7 of the caterpillars are endless tread belts or chains 9. The forward members 7 of the caterpillars are considerably less in diameter than the rearward members 6 and the shafts upon which they are supported are mounted slightly lower in the frame 3 than the rear axle 4. The wheels or members 6 and 7, however, are so proportioned in size and the axles for supporting them are so arranged in the frame 3 that the lower portions of the peripheries of the forward wheels 7 are slightly raised above the surface of the ground, that is to say, the lower portions of their peripheries lie above a plane which includes the lower portions of the peripheries of the traction wheels 3' and the rotatable members 6 of the caterpillars. The truck or frame is mounted at its forward end upon the ordinary traction wheels 3', these wheels being arranged in any suitable manner for steering the truck.

The truck is provided with suitable motive power by which it is propelled along its line of travel. In the drawings I have shown this as an engine 10 mounted in the forward end of the truck 3, driving through the medium of a sprocket chain 11, the two intermeshing gears 12 and 13. The gear 13 is mounted upon the shaft 14 which is mounted in bearings 15 in the frame and is driven by the gear 12 which receives power from the sprocket chain 11. At each end of the shaft 14 is mounted a pinion 16 lying within the caterpillars and meshing with gears 17 carried within the rearward members 6 of the caterpillars. The forward members 7 are rotatably mounted on the ends of their stud shafts 8 and are arranged to be driven idly by the tread belt 9.

I will now describe in detail the construction of the tread belt or chain 9. This belt is preferably composed of a number of arc-shaped plates or sections 25 linked or hinged together and forming an endless loop which encircles both of the rotatable members 6 and 7 of the caterpillars. The individual plates of the belt are each provided with a rather broad tongue 26 on one side and a corresponding slot 27 on the opposite side. The tongue 26 and the portions 28 of the plate which form the sides of the slots 27 are provided with holes 29. The plates 25 are hinged together by the pin or rod 30 passing through the holes 29 in the tongue 26 of one plate and the holes 29 in the portions 28 of the adjacent plate, the pin 30 being removably secured in place by cotter pins or other suitable means. The plates are preferably curved to the radius of the smaller member 7 of the caterpillar, so that they conform properly to the curvature of the rim of said member. Since this arc is of lesser radius than that of the large member 6, the chain rests on the periphery of said large member at the points where the plates or sections are hinged together.

Each plate is provided with the flanges 32 on its outside edges, these flanges being preferably formed integrally therewith, and projecting inwardly substantially at right angles thereto. The corresponding ends 34 of the flanges on each side of said plates 25 are provided with slots 33 between the sides of which the corresponding ends 34 of the next plate in order operate. The said ends 34 have slots 35 near their upper edges, these slots being drawn to the arc of a circle, the center of which is the axis of the joint between the plates. Bridging the slots 33 in the upper corners thereof are the pins 36 which ride in the slots 35 in the flange of the other plate. These slots 35 are so proportioned that they coöperate with the pins 36 and limit the hinge movement of the plates, thereby preventing the belt from being bent out of a straight line in the direction of the arrow, as shown in Fig. 1. In other words, they do not permit the chain to be bent or curved upwardly out of the plane which includes the lower portions of the peripheries of the rotatable members 6 and 7. By means of the pin and slot connection between the flanges, the chain is maintained rigid against bending in one direction, thus it serves, in a sense, as a substantially flat rigid plate placed between the two rotatable members and lying in a plane which includes the lower peripheries thereof.

It is obvious then that the structure which I have just described provides a large substantially flat surface or area in contact with the surface of the ground thus distributing the weight of the machine and preventing the machine from sinking into marshy or swampy ground. However, since the rotatable members 7 of the caterpillars are raised above the surface of the ground, the tread surface presented by the tread belt is slightly inclined or angularly disposed with respect to the surface of the ground and in consequence the soft ground is gradually compressed under the caterpillars and does not pile up in front thereof. When the machine is traveling over hard ground the forward member does not interfere in the least with the steering. This is manifest since the machine is supported on the lower portions of the rotatable members 6 only, just as would be the case if the truck were provided with the ordinary traction wheels.

I claim:

1. In a tractor the combination with a pair of alined tractor wheels, of a flexible metallic tractor belt trained around the peripheries of both said wheels, said belt comprising a series of ground-contact plates hinged together at their ends and each carrying an inwardly projecting flange at each side, adjacent flanges overlapping at their ends and thereby providing said belt with a substantially continuous flange at each side adapted to engage the rims of the wheels to hold the belt in place, the flanges of adjacent plates having pin-and-slot engagement with each other affording a limited flexure of the belt in one direction.

2. In a flexible metallic tractor belt a series of ground-contact plates hinged together at their ends to form an endless belt, inwardly projecting overlapping side flanges on said plates together forming a continuous flange for each side of said belt, one end of each of said side flanges being formed of two parallel plates separated to receive the overlapping end of the next adjacent flange between them, a transverse pin secured in said parallel plates and said intermediate plate having a slot through which said pin projects, said pin and slot and the adjacent hinge-pin serving to prevent the relative movement of said hinged plates, in one direction, out of a straight line.

3. In a tractor the combination with a pair of alined substantially pulley-like tractor wheels, of a flexible metallic tractor belt trained around the peripheries of both of said wheels, said belt comprising a series of ground-contact plates hinged together at their ends and each carrying an inwardly projecting flange at each side, adjacent flanges overlapping at their ends, thereby providing said belt with a substantially continuous flange at each side adapted to overlap the edges of the pulley-like wheels and hold the belt in place, the flanges of adjacent plates having pin-and-slot engagement with each other affording a limited flexure of the belt in one direction.

In testimony whereof I have hereunto set my hand this 8th day of September, 1910, in the presence of two subscribing witnesses.

TORBJORN LINGA.

Witnesses:
VICTOR J. HILL,
WM. MORRIS.